United States Patent
Park et al.

(10) Patent No.: US 11,728,115 B2
(45) Date of Patent: Aug. 15, 2023

(54) LATCH RELAY CAPABLE OF REAL-TIME STATE CONTROL, STATE CONTROL METHOD FOR LATCH RELAY, AND BATTERY PACK COMPRISING LATCH RELAY CAPABLE OF REAL-TIME STATE CONTROL

(71) Applicant: LG CHEM, LTD., Seoul (KR)

(72) Inventors: Jaedong Park, Daejeon (KR); Hyunki Cho, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 293 days.

(21) Appl. No.: 16/958,528

(22) PCT Filed: May 29, 2019

(86) PCT No.: PCT/KR2019/006418
§ 371 (c)(1),
(2) Date: Jun. 26, 2020

(87) PCT Pub. No.: WO2019/231228
PCT Pub. Date: Dec. 5, 2019

(65) Prior Publication Data
US 2021/0057179 A1    Feb. 25, 2021

(30) Foreign Application Priority Data

Jun. 1, 2018 (KR) .................. 10-2018-0063417

(51) Int. Cl.
*H01H 51/28* (2006.01)
*H01H 47/22* (2006.01)
(Continued)

(52) U.S. Cl.
CPC .......... *H01H 51/285* (2013.01); *H01H 47/22* (2013.01); *H01M 10/4264* (2013.01); *H02J 7/0031* (2013.01)

(58) Field of Classification Search
CPC ...... H01H 51/285; H01H 51/01; H01H 47/22; H01H 47/226; H01H 47/325;
(Continued)

(56) References Cited

U.S. PATENT DOCUMENTS 4,412,267 A * 10/1983 Hansen .................. H02H 3/243
361/104
4,418,374 A * 11/1983 Callan .................... H02H 3/243
361/187

(Continued)

FOREIGN PATENT DOCUMENTS

| CN | 207184025 U | 4/2018 |
| JP | 8-171844 A | 7/1996 |

(Continued)

OTHER PUBLICATIONS

International Search Report for PCT/KR2019/006418 dated Sep. 10, 2019.

*Primary Examiner* — Scott Bauer
*Assistant Examiner* — Sreeya Sreevatsa
(74) *Attorney, Agent, or Firm* — Birch, Stewart, Kolasch & Birch, LLP

(57) ABSTRACT

The present invention relates to a technology that monitors a normal operation state through whether the flow of minute current is maintained in real time when a latch relay is turned on and allows the latch relay to be forcibly turned off through current prestored in a supercapacitor when an off operation of the latch relay is not normally performed.

10 Claims, 3 Drawing Sheets

(51) Int. Cl.
*H01M 10/42* (2006.01)
*H02J 7/00* (2006.01)

(58) Field of Classification Search
CPC ... H01H 47/002; H01M 10/4264; H01M 50/20; H02J 7/0031; Y02E 60/10
USPC .............................................. 335/2
See application file for complete search history.

(56) References Cited

U.S. PATENT DOCUMENTS

| | | | |
|---|---|---|---|
| 2004/0174287 A1* | 9/2004 | Deak ............... | G08C 17/02 341/173 |
| 2013/0215549 A1 | 8/2013 | Aragai et al. | |
| 2014/0002093 A1* | 1/2014 | Elliott ............ | G01R 31/3278 324/423 |
| 2015/0001924 A1* | 1/2015 | Kamiya ............ | B60R 16/005 307/9.1 |

FOREIGN PATENT DOCUMENTS

| | | | |
|---|---|---|---|
| JP | 2770614 B2 | 7/1998 | |
| JP | 2000-113757 A | 4/2000 | |
| JP | 2013-62132 A | 4/2013 | |
| JP | 2013-134848 A | 7/2013 | |
| JP | 5799793 B2 | 10/2015 | |
| KR | 10-1995-0005239 B1 | 5/1995 | |
| KR | 20-0391682 Y1 | 8/2005 | |
| WO | WO 2017/068764 A1 | 4/2017 | |

* cited by examiner

[Figure 1]
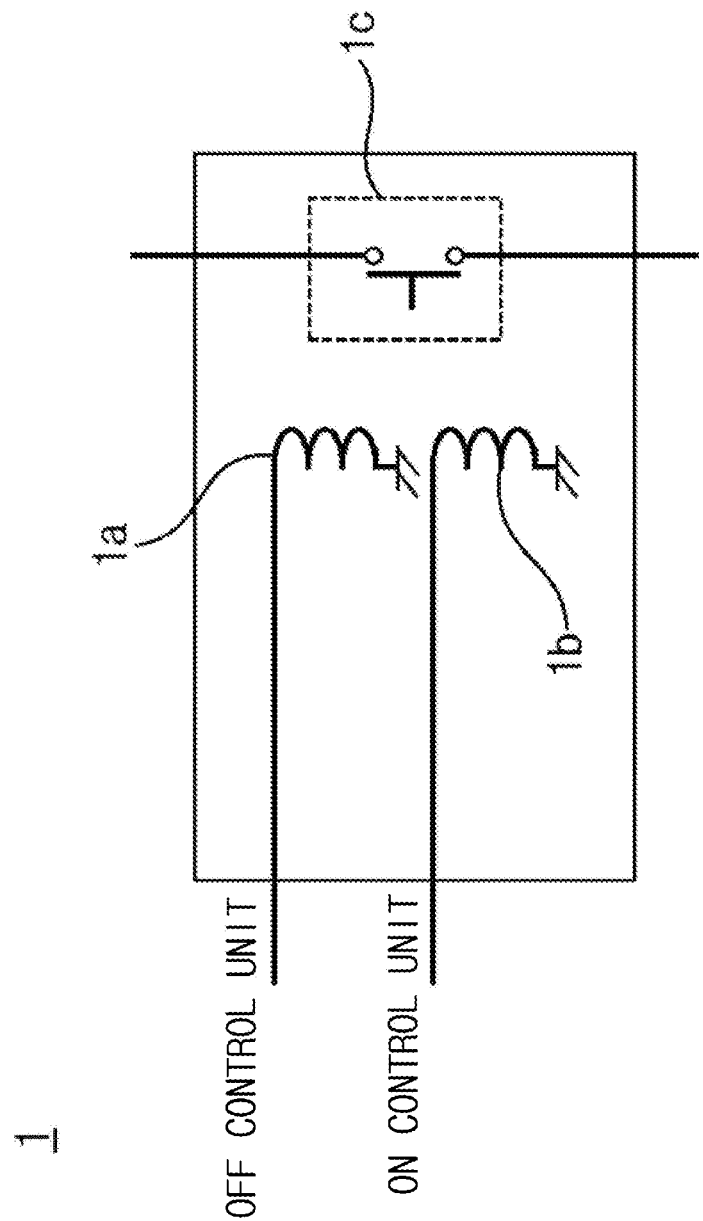

[Figure 2]
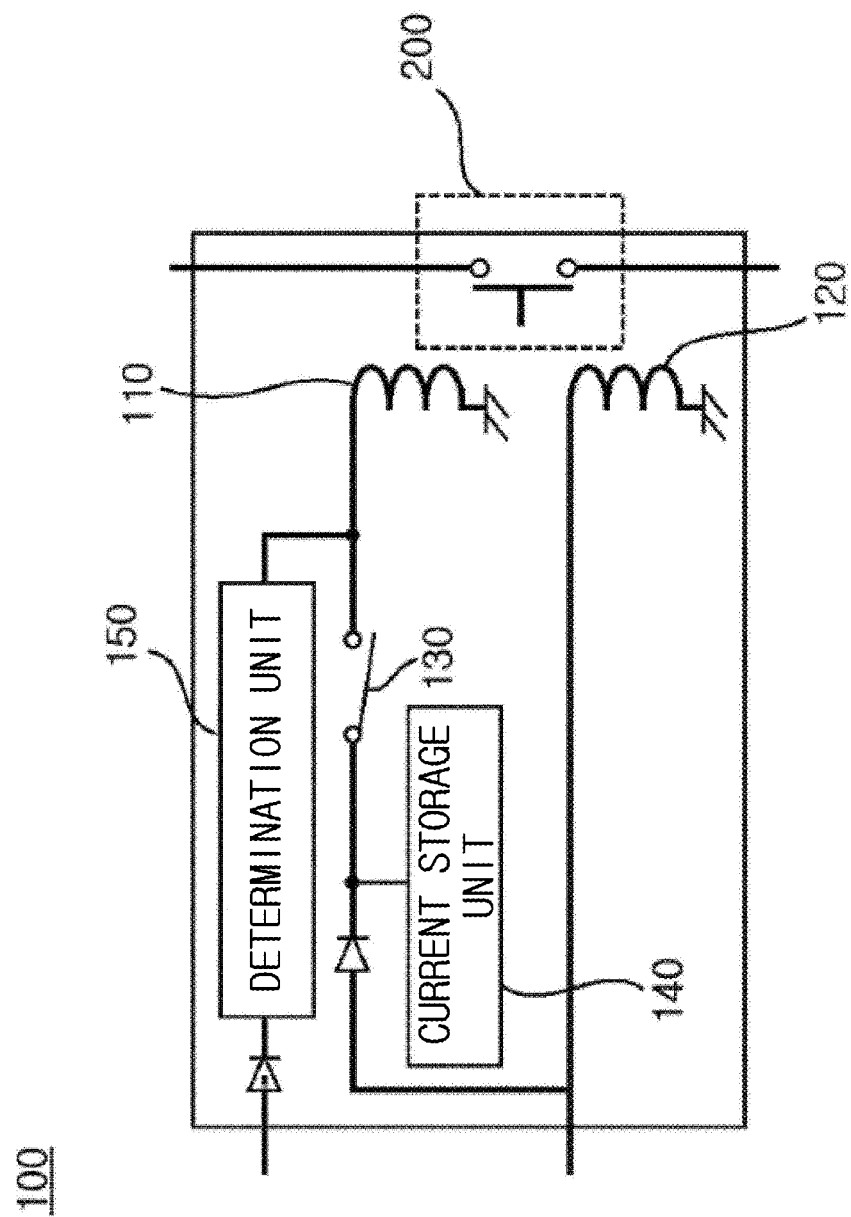

[Figure 3]
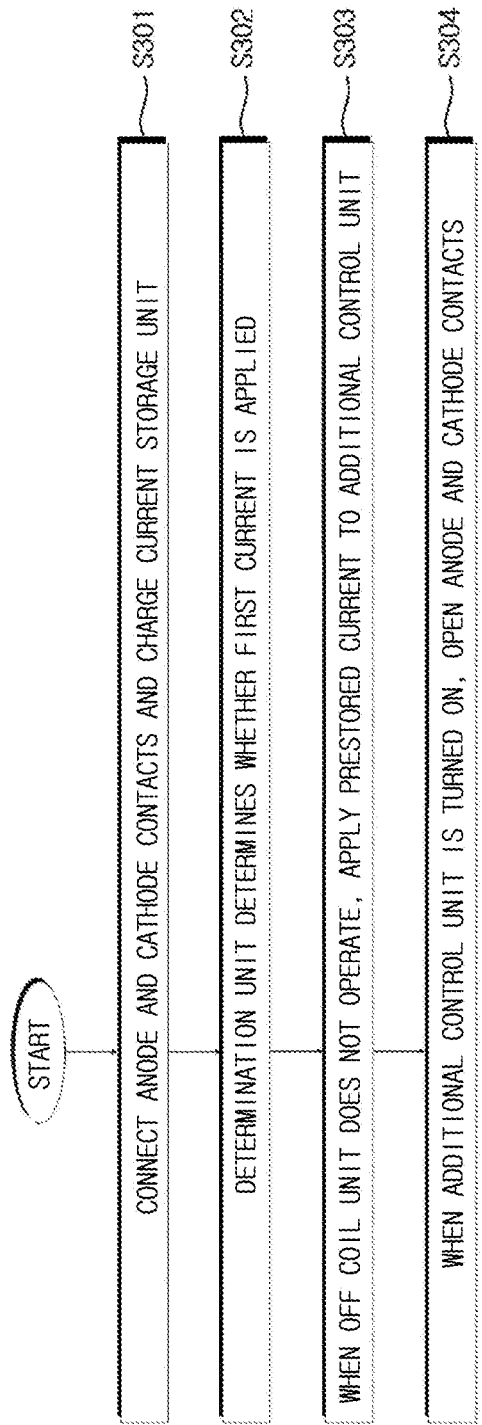

LATCH RELAY CAPABLE OF REAL-TIME STATE CONTROL, STATE CONTROL METHOD FOR LATCH RELAY, AND BATTERY PACK COMPRISING LATCH RELAY CAPABLE OF REAL-TIME STATE CONTROL

TECHNICAL FIELD

This application claims priority to and the benefit of Korean Patent Application No. 10-2018-0063417 filed in the Korean Intellectual Property Office on Jun. 1, 2018, the entire contents of which are incorporated herein by reference.

The present invention relates to a latch relay capable of real-time state control, a state control method of the latch relay, and a battery pack including the latch relay capable of the real-time state control, and more particularly, to a latch relay capable of real-time state control, a state control method of the latch relay, and a battery pack including the latch relay capable of the real-time state control, which monitor a normal operation state in real time through whether the flow of minute current is maintained in an ON operation of the latch relay and allow the latch relay to be forcibly turned off through current prestored in a supercapacitor when an OFF operation of the latch relay is not normally performed by an unexpected error.

BACKGROUND ART

In general, battery systems requiring high voltage and large capacity, such as electric vehicles or energy storage systems (ESS), are protected by switching elements such as relays.

When such a switching device cannot be normally driven by various failure modes, there is a demand for a protection device capable of stably blocking a circuit in a failure mode including a switch protection element, a driving circuit, and wires for protecting the battery system.

Meanwhile, in the case of a general relay used at this time, when the current is continuously conducted, the general relay keeps an ON state, and when the current is not conducted, the general relay keeps an OFF state and in order to prevent power consumption, a latch relay may be used instead of the general relay.

The latch relay is configured by combining an electromagnet and a permanent magnet and when a contact is made by pulling an iron plate through magnetic force of the electromagnet in a state where anode and cathode contacts are separated from each other (OPEN), the state is maintained through the magnetic force of the permanent magnet. For example, in order to release a bonding state of the iron plate, the magnetic force of the electromagnet is applied so as to face an opposite direction, so that the magnetic force of the permanent magnet is canceled and the contact between the anode and the cathode disappears.

When the latch relay using such a principle has an advantage of low power consumption, but power supplied to the latch relay is lost, or a reset coil (REST COIL) for turning off the latch relay is broken or the wire is broken by other failures, there is a problem that it is impossible to cope with in a dangerous situation of a battery.

DETAILED DESCRIPTION OF THE INVENTION

Technical Problem

The present invention, which is contrived to solve the problem, has been made in an effort to provide a latch relay capable of real-time state control, a state control method of the latch relay, and a battery pack including the latch relay capable of the real-time state control, which monitor a normal operation state in real time through whether the flow of minute current is maintained when the latch relay is turned on and allow the latch relay to be forcibly turned off through current prestored in a supercapacitor when an off operation of the latch relay is not normally performed due to an unexpected error.

Technical Solution

According to an embodiment of the present invention, a latch relay capable of real-time state control may include: an off coil unit positioned adjacent to anode and cathode contacts, an on coil unit positioned adjacent to anode and cathode contacts, an additional control unit connected between the off coil unit and the on coil unit and controlling an on/off operation of the off coil unit, and a current storage unit storing current supplied from the on coil unit and supplying the stored current to the additional control unit, in which when the off coil unit operates abnormally in a situation in which the on operation of the off coil unit is required, the current stored in the current storage unit is applied to the additional control unit, and as a result, the additional control unit is turned on and a connection state between the off coil unit and the anode and cathode contacts is turned on to open the anode and cathode contacts from each other.

In an embodiment, the latch relay may further include a determination unit determining whether a first current is applied to the anode and cathode contacts by the off coil unit when the off coil unit is turned on, in which as a determination result of the determination unit, when it is determined that the first current is not applied in an on operation state of the off coil unit, the determination unit allows the current stored in the current storage unit to be applied to the additional control unit to turn on the connection state between the off coil unit and the anode and cathode contacts.

In an embodiment, a current value of the first current may be smaller than a current value of current applied to the anode and cathode contacts from the on coil unit.

In an embodiment, the current storage unit may be periodically charged through current periodically supplied from the on coil unit.

In an embodiment, the current storage unit may be a super capacitor.

According to another embodiment of the present invention, a method for real-time state control of a latch relay may include: storing, by current storage unit, current supplied from an on coil unit when the on coil unit is turned on, the current storage unit being provided between an off coil unit and the on coil unit, wherein the off coil unit and the on coil unit are positioned adjacent to anode and cathode contacts; applying, when the off coil unit operates abnormally in a situation in which an on operation of the off coil unit is required, the current stored in the current storage unit to an additional control unit, the additional control unit being connected between the off coil unit and the on coil unit; and turning on a connection state between the off coil unit and the anode and cathode contacts while the additional control unit is turned on to open the anode and cathode contacts from each other.

In an embodiment, the method may further include: applying, by the off coil unit, a first current to the anode and cathode contacts when the on coil unit is turned on; and determining, by a determination unit, whether a state in which the first current is applied is maintained.

In an embodiment, the storing of the current supplied from the on coil unit may include periodically charging the current storage unit through current periodically supplied from the on coil unit.

According to yet another embodiment of the present invention, a battery pack may include: a battery module; and a latch relay including an off coil unit positioned adjacent to anode and cathode contacts of the battery module, an on coil unit positioned adjacent to anode and cathode contacts, an additional control unit connected between the off coil unit and the on coil unit and controlling an on/off operation of the off coil unit, and a current storage unit storing current supplied from the on coil unit and supplying the stored current to the additional control unit, wherein when the off coil unit operates abnormally in a situation in which the on operation of the off coil unit is required, the current stored in the current storage unit is applied to the additional control unit, and as a result, the additional control unit is turned on and a connection state between the off coil unit and the anode and cathode contacts of the battery module is turned on to open the anode and cathode contacts of the battery module from each other.

Advantageous Effects

According to an aspect of the present invention, there is an advantage that a power failure of a circuit can be confirmed in advance by monitoring a normal operation state in real time through whether the flow of minute current is maintained when a latch relay is turned on.

Further, according to an aspect of the present invention, there is an advantage that when an off operation of the latch relay is not normally performed due to an unexpected error, the latch relay is forcibly turned off through current pre-stored in a supercapacitor, thereby rapidly controlling a circuit in a dangerous situation.

BRIEF DESCRIPTION OF DRAWINGS

FIG. 1 is a diagram schematically illustrating a configuration of a general latch relay 1 in the related art.

FIG. 2 is a diagram schematically illustrating a configuration of a latch relay 100 capable of real-time state control according to an embodiment of the present invention.

FIG. 3 is a diagram illustrating a process of controlling a state of the latch relay 100 capable of the real-time state control illustrated in FIG. 2 in a sequential order.

BEST MODE

Hereinafter, a preferred embodiment is presented in order to assist understanding of the present invention. However, the following embodiment is just provided to more easily understand the present invention and contents of the present invention are not limited by the embodiment.

FIG. 1 is a diagram schematically illustrating a configuration of a general latch relay 1 in the related art. Referring to FIG. 1, the general latch relay 1 is configured to include an off control unit 1a for off control, an on control unit 1b for on control, and anode and cathode contacts 1c.

In this case, when the current is conducted for a predetermined threshold time (for example, 50 to 100 ms) through the on control unit 1b, an iron plate connecting the anode and cathode contacts is attached by an electromagnet, so that an anode and a cathode are connected to each other, so that a bonding state of the iron plate is maintained by the electromagnet.

Further, when the current is conducted for the predetermined threshold time (e.g., 50 to 100 ms) through the off control unit 1a, magnetic force in an opposite direction for canceling the magnetic force of a two-way magnet is generated, and as a result, current conduction is removed while the iron plate is separated from the anode and cathode contacts.

However, in the case of the general latch relay 1 in the related art, the off control unit 1a may not normally operate due to power loss, a failure of the off control unit 1a or the on control unit 1b, disconnection, etc. This has a problem that the latch relay 1 as a switching element may be somewhat unreliable in that it is difficult to guarantee safety of circuit interception.

FIG. 2 is a diagram schematically illustrating a configuration of a latch relay 100 capable of real-time state control according to an embodiment of the present invention.

Referring to FIG. 2, the latch relay 100 capable of real-time state control according to an embodiment of the present invention may be configured to largely include an off coil unit 110, an on coil unit 120, an additional control unit 130, and a current storage unit 140 and in an embodiment, the latch relay 100 may be configured to additionally further include a determination unit 150.

First, the off coil unit 110 is positioned adjacent to the anode and cathode contacts 200 to release (or open) the bonding state of the iron plates included in the anode and cathode contacts 200.

The off coil unit 110 is connected to the on coil unit 120 through the additional control unit 130 and an on/off operation may be controlled by the additional control unit 130.

The off coil unit 110 continuously applies a first current corresponding to a minute current to the anode and cathode contacts 200 while the anode and cathode contacts 200 are connected to each other and the determination unit 150 determines whether the first current is continuously applied.

For example, as a determination result of the determination unit 150, when it is determined that the first current is not applied to the anode and cathode contacts 200 through the off coil unit 110, the current stored in the current storage unit 140 is allowed to be applied to the additional control unit 130.

In this case, a current value of the first current has a current value smaller than a current value required for the on operation of the anode and cathode contacts 200 and the determination unit 150 checks whether the first current value is continuously conducted in real time.

The on coil unit 120 is positioned adjacent to the anode and cathode contacts 200 while being parallel to the off coil unit 110 to serve to close the bonding state of the iron plates included in the anode and cathode contacts 200.

As the on coil unit 120 includes a permanent magnet (not illustrated), when the anode and cathode contacts 200 are connected by the on coil unit 120, a connection state of the anode and cathode contacts 200 is maintained by the permanent magnet.

Meanwhile, the current storage unit 140 may be charged while periodically receiving current from the on coil unit 120 (or charged through periodic generation of on current), and the current storage unit 140 may correspond to a supercapacitor in one example.

Accordingly, the determination unit 150 checks a continuous conduction state of the first current to monitor whether the off coil unit 110 normally operates in real time and the additional control unit 130 is operated through the current prestored in the current storage unit 140 even in failure of the off coil unit 110, and as a result, for example, there may be an effect that the off coil unit 110 normally operates.

Next, a process for controlling the state of the latch relay 100 will be described in sequence with reference to FIG. 3.

FIG. 3 is a diagram illustrating a process of controlling a state of the latch relay 100 capable of the real-time state control illustrated in FIG. 2 in a sequential order.

Referring to FIG. 3, first, the anode and cathode contacts are connected as the on coil unit is turned on and at the same time, the current storage unit is charged while storing the current supplied from the on coil unit (S301).

Then, the determination unit determines whether the first current is normally applied to the anode and cathode contacts from the off coil unit (S302).

When the off coil unit does not normally operate in a situation (for example, when the first current is not applied, controller operation movement, disconnection etc.) in which the on operation of the off coil unit is required, the current stored in the current control unit is applied to the additional control unit (S303) and while the additional control unit is turned on, a connection state between the off coil unit and the anode and cathode contacts is turned on to open the anode and cathode contacts from each other (S304).

Meanwhile, in another embodiment, the present invention may include a battery pack including the latch relay 100 described above.

More specifically, the off coil unit 110 and the on coil unit 120 may be positioned adjacent to the anode and cathode contacts of a battery module (not illustrated) constituted by multiple battery cells, respectively and the latch relay 100 may be constituted by one unit and included in the battery pack.

The present invention has been described with reference to the preferred embodiments of the present invention, but those skilled in the art will understand that the present invention can be variously modified and changed without departing from the spirit and the scope of the present invention which are defined in the appended claims.

The invention claimed is:

1. A latch relay for real-time state control, comprising:
   an off coil unit positioned adjacent to anode and cathode contacts;
   an on coil unit positioned adjacent to anode and cathode contacts;
   an additional control unit connected between the off coil unit and the on coil unit and controlling an on/off operation of the off coil unit;
   a current storage unit storing current supplied from the on coil unit and supplying the stored current to the additional control unit; and
   a determination unit determining whether a first current is applied to the anode and cathode contacts by the off coil unit when the off coil unit is turned on,
   wherein the determination unit is directly connected to a node between the additional control unit and the off coil unit,
   wherein when the off coil unit operates abnormally in a situation in which the on operation of the off coil unit is required, the current stored in the current storage unit is applied to the additional control unit, and as a result, the additional control unit is turned on and a connection state between the off coil unit and the anode and cathode contacts is turned on to open the anode and cathode contacts from each other, and
   wherein the current storage unit is positioned between the additional control unit and the on coil unit.

2. The latch relay of claim 1,
   wherein as a determination result of the determination unit, when it is determined that the first current is not applied in an on operation state of the off coil unit, the determination unit allows the current stored in the current storage unit to be applied to the additional control unit to turn on the connection state between the off coil unit and the anode and cathode contacts.

3. The latch relay of claim 2, wherein a current value of the first current is smaller than a current value of current required for turning on the anode and cathode contacts.

4. The latch relay of claim 2, wherein when the determination unit determines that the first current is not applied in the on operation state of the off coil unit, the determination unit allows the current stored in the current storage unit to be applied to the additional control unit to physically change a contact state of the additional control unit from an open state to a closed state.

5. The latch relay of claim 1, wherein the current storage unit is periodically charged through current periodically supplied from the on coil unit.

6. The latch relay of claim 1, wherein the current storage unit is a supercapacitor.

7. The latch relay of claim 1, wherein the additional control unit is a switching element.

8. A method for real-time state control of a latch relay, the method comprising:
   storing, by a current storage unit, current supplied from an on coil unit when the on coil unit is turned on, the current storage unit being provided between an off coil unit and the on coil unit,
   wherein the off coil unit and the on coil unit are positioned adjacent to anode and cathode contacts;
   applying, when the off coil unit operates abnormally in a situation in which an on operation of the off coil unit is required, the current stored in the current storage unit to an additional control unit, the additional control unit being connected between the off coil unit and the on coil unit;
   turning on a connection state between the off coil unit and the anode and cathode contacts while the additional control unit is turned on to open the anode and cathode contacts from each other;
   applying, by the off coil unit, a first current to the anode and cathode contacts when the on coil unit is turned on; and
   determining, by a determination unit, whether a state in which the first current is applied is maintained,
   wherein the determination unit is directly connected to a node between the additional control unit and the off coil unit, and
   wherein the current storage unit is positioned between the additional control unit and the on coil unit.

9. The method of claim 8, wherein the storing of the current supplied from the on coil unit includes periodically charging the current storage unit through current periodically supplied from the on coil unit.

10. A battery pack comprising:
    a battery module; and
    a latch relay including:
        an off coil unit positioned adjacent to anode and cathode contacts of the battery module;
        an on coil unit positioned adjacent to the anode and cathode contacts of the battery module;

an additional control unit connected between the off coil unit and the on coil unit and controlling an on/off operation of the off coil unit;

a current storage unit storing current supplied from the on coil unit and supplying the stored current to the additional control unit; and a determination unit determining whether a first current is applied to the anode and cathode contacts by the off coil unit when the off coil unit is turned on, wherein the determination unit is directly connected to a node between the additional control unit and the off coil unit, wherein when the off coil unit operates abnormally in a situation in which the on operation of the off coil unit is required, the current stored in the current storage unit is applied to the additional control unit, and as a result, the additional control unit is turned on and a connection state between the off coil unit and the anode and cathode contacts of the battery module is turned on to open the anode and cathode contacts of the battery module from each other, and wherein the current storage unit is positioned between the additional control unit and the on coil unit.

* * * * *